US 12,371,033 B2

(12) United States Patent
Plecko et al.

(10) Patent No.: US 12,371,033 B2
(45) Date of Patent: Jul. 29, 2025

(54) OPERATING METHOD FOR A REDUNDANT SENSOR ASSEMBLY OF A VEHICLE SYSTEM AND CORRESPONDING REDUNDANT SENSOR ASSEMBLY

(71) Applicant: Robert Bosch GmbH, Stuttgart (DE)

(72) Inventors: Sven Plecko, Bietigheim-Bissingen (DE); Fei Xie, Heilbronn (DE); Florian Koebl, Erlenbach (DE); Daniel Ruiz Duran, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 587 days.

(21) Appl. No.: 17/289,617

(22) PCT Filed: Nov. 13, 2019

(86) PCT No.: PCT/EP2019/081206
§ 371 (c)(1),
(2) Date: Apr. 28, 2021

(87) PCT Pub. No.: WO2020/104277
PCT Pub. Date: May 28, 2020

(65) Prior Publication Data
US 2021/0394771 A1    Dec. 23, 2021

(30) Foreign Application Priority Data
Nov. 22, 2018 (DE) ...................... 10 2018 220 065.3

(51) Int. Cl.
*B60W 50/023* (2012.01)
*B60T 8/171* (2006.01)
(Continued)

(52) U.S. Cl.
CPC ........... *B60W 50/023* (2013.01); *B60T 8/171* (2013.01); *B60T 8/885* (2013.01); *B60T 17/221* (2013.01);
(Continued)

(58) Field of Classification Search
CPC ........... B60W 50/023; B60W 50/0205; B60W 50/04; B60T 8/171; B60T 8/885;
(Continued)

(56) References Cited

U.S. PATENT DOCUMENTS 6,704,628 B1 * 3/2004 Fennel ................ G06F 11/0757
9,195,232 B1 * 11/2015 Trawick .............. B60W 10/184
(Continued)

FOREIGN PATENT DOCUMENTS

DE    10 2012 218 274 A1    4/2014
DE    10 2014 208 391 A1    11/2015
(Continued)

OTHER PUBLICATIONS

International Search Report corresponding to PCT Application No. PCT/EP2019/081206, mailed Mar. 13, 2020 (German and English language document) (6 pages).

*Primary Examiner* — Rachid Bendidi
*Assistant Examiner* — Kirsten Jade M Santos
(74) *Attorney, Agent, or Firm* — Maginot, Moore & Beck LLP

(57) ABSTRACT

An operating method for a redundant sensor arrangement of a vehicle system including a primary controller, a secondary controller and multiple sensors, wherein the individual sensors, in a normal mode of the vehicle system, are each coupled to the primary controller and, in an emergency mode of the vehicle system, are each coupled to the secondary controller and are supplied with power, wherein the controller that is coupled to the sensors receives and evaluates signals from the individual sensors, includes applying an operating voltage to both controllers and coupling the sensors to the primary controller and checking the coupled sensors with the primary controller. The secondary controller, in the decoupled state, checks its internal voltage supply (Continued)

and at least one internal signal path. Then, the secondary controller is connected to the sensors to checking their power supply. The system initialization is concluded when no errors have occurred.

13 Claims, 6 Drawing Sheets

(51) Int. Cl.
    *B60T 8/88*      (2006.01)
    *B60T 17/22*      (2006.01)
    *B60W 50/02*      (2012.01)

(52) U.S. Cl.
    CPC .... *B60W 50/0205* (2013.01); *B60T 2270/402* (2013.01); *B60T 2270/406* (2013.01); *B60T 2270/413* (2013.01)

(58) Field of Classification Search
    CPC ............. B60T 17/221; B60T 2270/402; B60T 2270/406; B60T 17/22; B60T 2270/413; B60Y 2400/30
    See application file for complete search history.

(56) References Cited

U.S. PATENT DOCUMENTS

| 2017/0153122 | A1* | 6/2017 | Tang | B64C 39/024 |
| 2017/0277153 | A1* | 9/2017 | Soheil | G05B 19/0425 |
| 2018/0290642 | A1* | 10/2018 | Alexander | B60T 17/221 |

FOREIGN PATENT DOCUMENTS

| DE | 10 2015 110 965 A1 | 1/2016 | |
| DE | 10 2014 221 901 A1 | 4/2016 | |
| DE | 10 2015 202 335 A1 | 8/2016 | |
| DE | 102009012887 A1 * | 11/2019 | B60T 8/885 |
| EP | 3 385 934 A1 | 10/2018 | |

\* cited by examiner

OPERATING METHOD FOR A REDUNDANT SENSOR ASSEMBLY OF A VEHICLE SYSTEM AND CORRESPONDING REDUNDANT SENSOR ASSEMBLY

This application is a 35 U.S.C. § 371 National Stage Application of PCT/EP2019/081206, filed on Nov. 13, 2019, which claims the benefit of priority to Serial No. DE 10 2018 220 065.3, filed on Nov. 22, 2018 in Germany, the disclosures of which are incorporated herein by reference in their entirety.

The disclosure is based on an operating method for a redundant sensor arrangement of a vehicle system of the type in question in the disclosure. Moreover, the disclosure relates to a redundant sensor arrangement for a vehicle system.

DE 10 2015 202 335 A1 discloses a wheel sensor apparatus that comprises a first sensor element, by means of which at least one first sensor variable for a speed and/or rotation velocity of the wheel is providable to at least one evaluation and/or control apparatus of the vehicle, and an additional second sensor element. In this instance, at least one second sensor variable for the speed and/or rotation velocity of the same wheel is providable to the at least one evaluation and/or control apparatus by means of the second sensor element.

DE 10 20 14 208 391 A1 discloses an apparatus for operating a vehicle, which apparatus comprises a coupling device designed to decouple a speed sensor from a primary power supply of a primary controller of a primary braking control system and to couple said speed sensor to a secondary power supply. Further, a control device is disclosed that is designed to control the coupling device on the basis of an error signal from the primary controller, so that an error in the primary controller can result in the speed sensor being decoupled from the primary power supply and coupled to the secondary power supply.

SUMMARY

The operating method for a redundant sensor arrangement of a vehicle system having the features of the disclosure has the advantage that the possible coupling of a sensor to two controllers allows the availability of the sensor to be increased, in particular for a situation in which one of the controllers fails and the other needs to perform the function of the failed controller. Further, the possible coupling of a sensor to two controllers allows a cost saving while retaining signal availability, since for example no sensors need to be kept available in duplicate, that is to say one independent sensor per controller in each case, for example. Embodiments of the operating method according to the disclosure for a redundant sensor arrangement of a vehicle system allow the possible couplings of the individual sensors to the primary controller to be checked during initialization. Subsequently or at the same time, an internal voltage supply and at least one internal signal path in the secondary controller can be checked before the secondary controller is connected to the sensors in a second checking step and checks a power supply of the individual sensors that is provided by the primary controller, before the vehicle can be released for an autonomous driving mode.

Embodiments of the operating method according to the disclosure for a redundant sensor arrangement of a vehicle system advantageously allow an initialization and test phase having optimized timing, wherein during the test phase of the secondary controller the sensor signals of all sensors are available and a limited mode of the vehicle system is possible. Moreover, during the initialization and test phase there is no requirement for handover of the individual sensors between the primary controller and the secondary controller, which would mean decoupling the relevant sensor from the primary controller and coupling the relevant sensor to the secondary controller. It is therefore also not necessary to reset the sensors that are to be handed over, which advantageously results in a reduction in the reset cycles in the individual sensors. There is therefore also no signal loss at the primary controller caused by the reset and thus also no limitation of the vehicle system. In the case of a braking system, this means that a backup ABS function without ESP functionality is not necessary. Embodiments of the operating method according to the disclosure allow a passive test process for the secondary controller, as a result of which no changeover of the individual sensors is necessary and the primary controller is available more quickly after initialization.

Embodiments of the present disclosure provide an operating method for a redundant sensor arrangement of a vehicle system, which sensor arrangement comprises a primary controller, a secondary controller and multiple sensors. The individual sensors, in a normal mode of the vehicle system, are each coupled to the primary controller and, in an emergency mode of the vehicle system, are each coupled to the secondary controller and are supplied with power. The controller that is coupled to the sensors receives and evaluates signals from the individual sensors. Initialization of the sensor arrangement in this instance involves an operating voltage being applied to both controllers and a check on the sensor arrangement being performed, wherein the sensors, in a first checking step, are coupled to the primary controller and checked by the latter and decoupled from the secondary controller. The secondary controller, in the decoupled state, checks its internal voltage supply and at least one internal signal path, wherein the secondary controller, in a second checking step, is connected to the sensors and checks a power supply of the individual sensors. The initialization of the sensor arrangement is concluded if no errors have occurred during the check on the sensor arrangement.

Moreover, a redundant sensor arrangement for a vehicle system for performing the operating method is proposed that comprises a primary controller, a secondary controller and multiple sensors. The individual sensors, in a normal mode of the vehicle system, are each coupled to the primary controller and, in an emergency mode of the vehicle system, are each coupled to the secondary controller and are supplied with power, wherein the controller that is coupled to the sensors receives and evaluates signals from the individual sensors. The primary controller and/or the secondary controller in this instance have at least one test circuit that generates test signals for checking at least one internal signal path.

A controller can be understood in the present case to mean an electrical device that processes and evaluates detected sensor signals. The controller can have at least one interface, which may be in hardware and/or software form. When in hardware form, the interfaces may be part of what is known as a system ASIC (application-specific integrated circuit) chip, for example, which includes different functions of the controller. However, it is also possible for the interfaces to be separate integrated circuits or to consist, at least in part, of discrete components. When in software form, the interfaces may be software modules that are present on a microcontroller besides other software modules, for example. Another advantage is a computer program product having program code that is stored on a machine-readable medium such as a semiconductor memory, a hard-disk memory or an optical memory and is used to perform the evaluation when the program is executed by the controller.

The sensors may be embodied as speed sensors, for example, and arranged on a vehicle wheel, the controllers being able to be two controllers for controlling actuators for producing braking effects for the vehicle, for example a braking force booster, a hydraulic unit or a parking brake.

The measures and developments presented in the disclosure allow advantageous improvements of the operating method for a redundant sensor arrangement of a vehicle system that is specified in the disclosure.

It is particularly advantageous that the sensors are, in the coupled state, each connected to a supply connection via a supply path and to a ground connection of the associated controller via a ground path and supplied with power, wherein a measuring element for receiving the respective sensor signal is arranged at least in the ground path. The supply path extends in each case from a first controller input to a supply, that is to say a current/voltage source, of the respective controller. The ground path extends from a second controller input of the respective controller to a ground connection. The primary controller and the secondary controller are therefore both capable of connecting the individual sensors to ground or to a supply and therefore of operating the individual sensors. In the case of a sensor embodied as a speed sensor, there may be provision for four sensors that each detect a speed or rotation velocity of a vehicle wheel. In this case, each of the four sensors is connected to associated controller inputs of the primary controller and the secondary controller. In that event, there is then also fourfold provision for the respective ground and supply paths. The individual measuring elements allow the signals actually generated at the individual sensors to be ascertained. The measuring element can be a measuring resistor or current mirror, for example.

In one advantageous configuration of the operating method, monitoring of the primary controller and of the power supply of the individual sensors coupled to the primary controller can be performed in the secondary controller in the normal mode of the vehicle system. To this end, the secondary controller can detect a supply voltage at the individual sensors. To detect the supply voltage, evaluation electronics of the secondary controller can be electrically connected to the individual sensors via a respective switching unit. In this instance, the individual sensors are not connected to the supply path and the ground path of the secondary controller, however. The sensors continue to be supplied with power by the primary controller. If the supply to the sensor by the primary controller fails, then the secondary controller can initiate or prepare for acceptance of the sensors faster. Moreover, an absence of information that the primary controller transfers via the data connection can be plausibilized. In addition, in the absence of the supply voltage, the secondary controller can electrically connect a corresponding sensor to the supply connection of the secondary controller via the supply path and to the ground connection of the secondary controller via the ground path.

In a further advantageous configuration of the operating method, at least one test signal can be generated in the secondary controller for the purpose of checking the at least one internal signal path. The at least one test signal can be generated by at least one additional test circuit, for example. If required, the test signals can additionally also be used to check the current carrying capacity and the applicable monitoring functions in the secondary controller. Moreover, the at least one test circuit can be used to check all measuring elements and signal paths as far as the evaluation and control unit of the secondary controller by virtue of an appropriate test signal being impressed.

In a further advantageous configuration of the operating method, an installation inspection of the individual sensors can be performed in a predefinable order after initialization of the sensor arrangement has concluded. This can involve for example in each case at least one piece of installation information about the individual sensors being ascertained in the primary controller and in the secondary controller and said pieces of installation information being compared with one another, wherein the check can be recognized as successful if, for the sensor that is to be checked, the at least one piece of installation information ascertained in the primary controller is concordant with the at least one piece of installation information ascertained in the secondary controller. The at least one piece of installation information of the individual sensors can preferably comprise information about installation position and/or contact-connection of the corresponding sensor. In the case of a braking system and sensors embodied as speed sensors, the information about the installation position can represent for example the vehicle wheel at which the respective sensor is supposed to detect the speed or rotation velocity. The information about the contact-connection can concern for example the connection terminals on the respective controller that are supposed to be used to make contact with the respective sensor. In this instance, the installation inspection of the individual sensors can be performed for example in an end-of-line test after a first initialization of the sensor arrangement during manufacture of the vehicle or at the end of a workshop visit.

In a further advantageous configuration of the operating method, the installation information of the individual sensors can be transferred from the non-checking controller to the checking controller prior to the check. Moreover, the checking controller can ascertain the installation information of the individual sensors that are to be checked and can compare it with the installation information received from the non-checking controller, wherein the checking controller can transfer the check result to the non-checking controller. In this embodiment, prior to the check, the installation information for all sensors that are to be checked can be transferred to the checking controller individually or jointly. If for example the secondary controller performs the check, then the primary controller, prior to the check, transfers its installation information for the individual sensors to the secondary controller, which, following the check, transfers the check result to the primary controller. If the primary controller performs the check, then prior to the check the secondary controller transfers its installation information for the individual sensors to the primary controller, which, following the check, transfers the check result to the secondary controller. Alternatively, the individual sensors can be checked in a predefined order or according to a predefined pattern regarding their installation position and/or their contact-connection, wherein the predefined order or the predefined pattern of the check is stored in the primary controller and in the secondary controller. The check can be recognized as successful in this instance if the order of the sensors checked by the primary controller is concordant with the order of the sensors checked by the secondary controller. In the alternative embodiment, the communication effort between the controllers can be reduced.

In a possible embodiment of the operating method with an installation inspection of the individual sensors, the primary controller can hand over the individual sensors sequentially to the secondary controller. In this instance the individual sensors to be checked can each be decoupled from the primary controller and coupled to the secondary controller and checked by the latter. As already explained above, the primary controller can transmit at least one piece of installation information of the corresponding sensor or from all sensors to the secondary controller prior to the decoupling. The secondary controller then compares its ascertained at least one piece of installation information for the corresponding sensor with the transmitted at least one piece of installation information. Alternatively, the primary controller can hand over the individual sensors to the secondary controller in a predefined order or according to a predefined pattern. Here, the secondary controller can compare the position of the handed-over sensor with the position thereof in the stored predefined order or in the stored pattern. In this instance the secondary controller can return the respective checked sensor to the primary controller, as a result of which the checked sensor can once again be coupled to the primary controller and decoupled from the secondary controller. The secondary controller can transfer the respective check result for the individual sensors to the primary controller directly after the check or collectively after the check on all sensors. The handover of the individual sensors between the primary controller and the secondary controller means that this embodiment of the operating method with installation inspection of the individual sensors is preferably performed only during manufacture of the vehicle in an end-of-line test or at the end of a workshop visit and not during normal operation of the vehicle.

In an alternative configuration of the operating method with an installation inspection of the individual sensors, the individual sensors can be decoupled from the primary controller sequentially and the secondary controller can check the power supply of the connected sensors continually. In this instance the secondary controller can detect the sensor that is not supplied with power by the primary controller and can check the at least one piece of installation information of said sensor. Following the check, the checked sensor can once again be coupled to the primary controller. As already explained above, the primary controller can transmit at least one piece of installation information of the corresponding sensor or from all sensors to the secondary controller prior to the decoupling. The secondary controller then compares its ascertained at least one piece of installation information for the corresponding sensor with the transmitted at least one piece of installation information. Alternatively, the primary controller can decouple the individual sensors in a predefined order or according to a predefined pattern. Here, the secondary controller can compare the position of the sensor decoupled from the primary controller with the position of said sensor in the stored predefined order or in the stored pattern. The secondary controller can transfer the respective check result for the individual sensors to the primary controller directly after the check or collectively after the check on all sensors. In this embodiment of the operating method with installation inspection of the individual sensors, there is advantageously no need for sensor acceptance by the secondary controller, as a result of which the individual sensors are not coupled to the secondary controller. Flow control is restricted to the primary controller and is not subject to any runtime limitation by a data bus system to which the two controllers are connected.

In a further alternative configuration of the operating method with an installation inspection of the individual sensors, the secondary controller can sequentially manipulate sensor signals of the individual sensors, and the primary controller can detect the manipulated sensor and check the at least one piece of installation information of the corresponding sensor, wherein the secondary controller can terminate the manipulation of the sensor signal from the checked sensor after the check. As already explained above, the secondary controller can transmit at least one piece of installation information of the corresponding sensor or from all sensors to the primary controller prior to the manipulation of the sensor signal. The primary controller then compares its ascertained at least one piece of installation information for the corresponding manipulated sensor with the transmitted at least one piece of installation information. Alternatively, the secondary controller can manipulate the sensor signal from the individual sensors in a predefined order or according to a predefined pattern. Here, the primary controller can compare the position of the manipulated sensor with the position thereof in the stored predefined order or in the stored pattern. The primary controller can transfer the respective check result for the individual sensors to the secondary controller directly after the check or collectively after the check on all sensors. In this embodiment of the operating method with installation inspection of the individual sensors, there is advantageously likewise no need for sensor acceptance by the secondary controller, as a result of which the individual sensors are not coupled to the secondary controller. Flow control is restricted to the secondary controller and is not subject to any runtime limitation by a data bus system to which the two controllers are connected. The manipulation of the sensor signal merely results in a brief signal loss at the primary controller, without the manipulated sensor performing a reset cycle.

Exemplary embodiments of the disclosure are depicted in the drawing and are explained in more detail in the description that follows. In the drawing, identical reference signs denote components and elements that perform identical or analogous functions.

DETAILED DESCRIPTION

Figure 1:
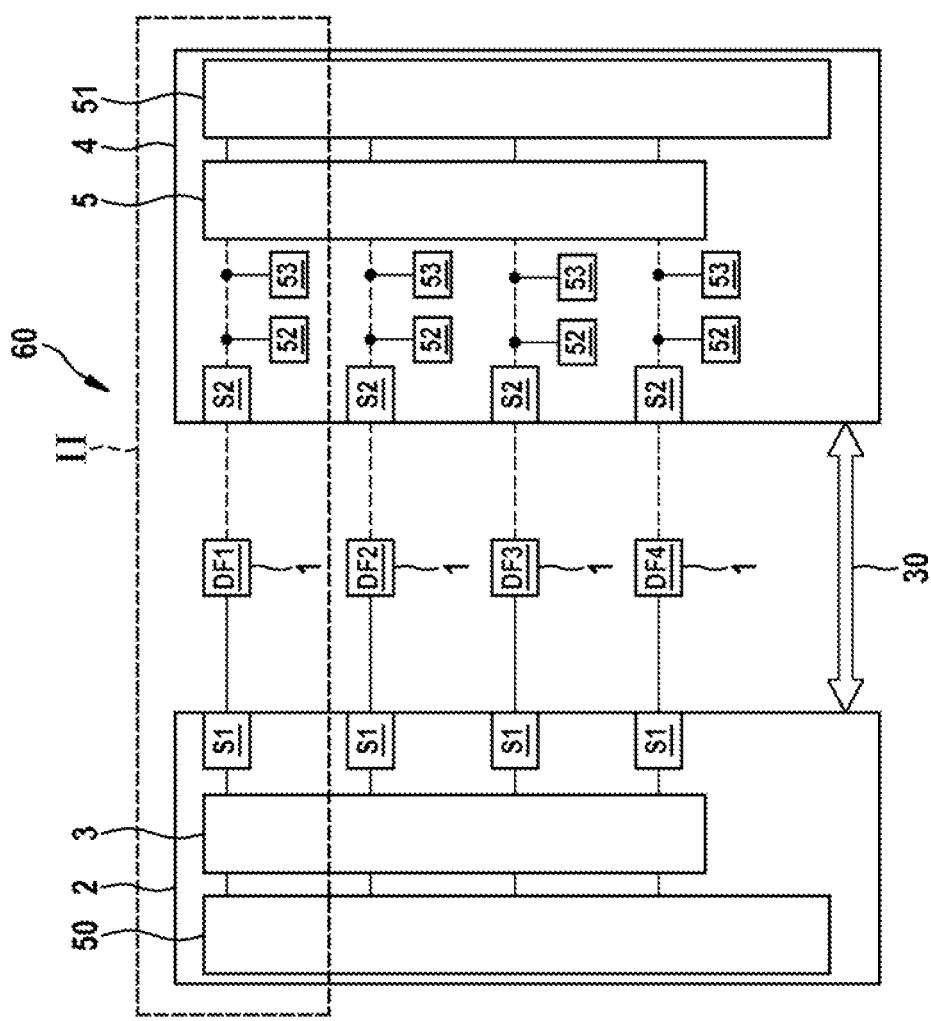
FIG. 1 shows a schematic block diagram of an exemplary embodiment of a redundant sensor arrangement of a vehicle system operated by means of an operating method according to the disclosure.
Figure 2:
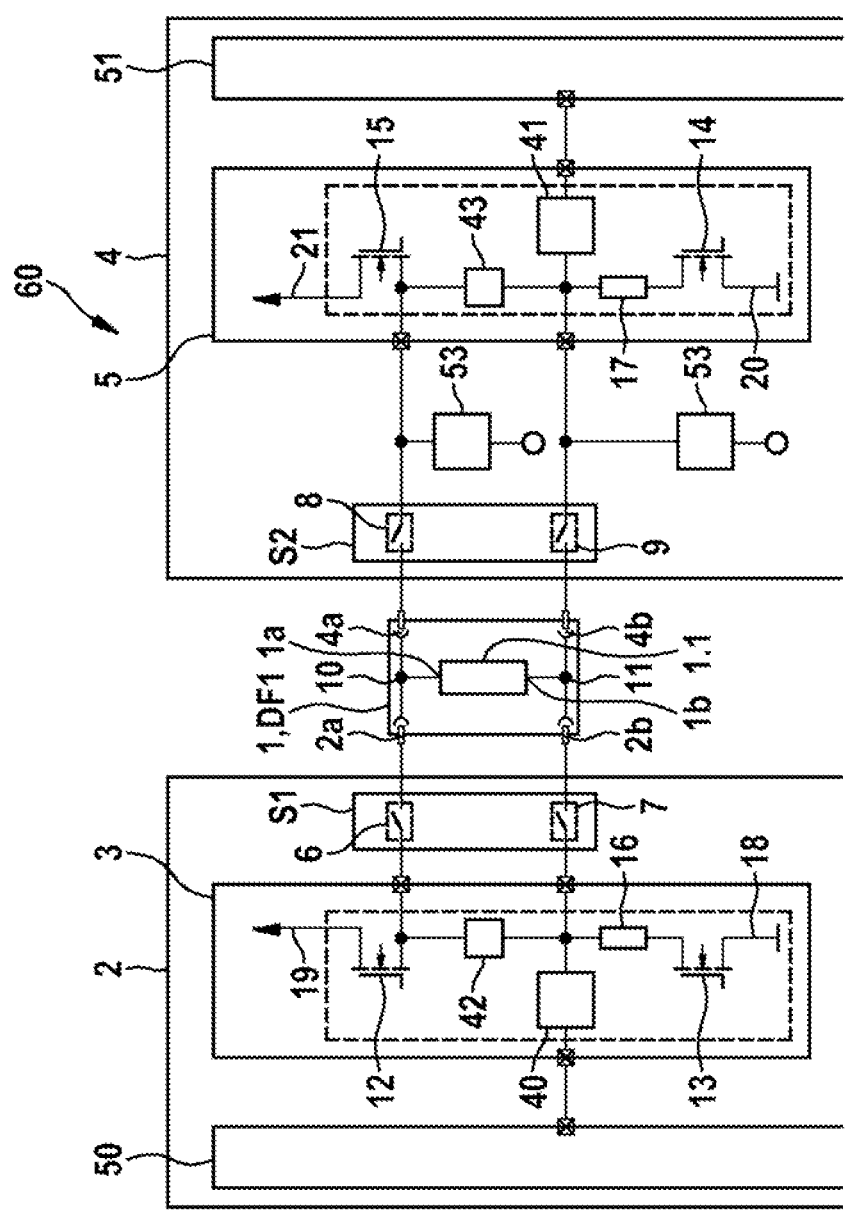
FIG. 2 shows a more detailed depiction of a detail from the redundant sensor arrangement from FIG. 1.

As can be seen from FIGS. 1 and 2, the depicted exemplary embodiment of a redundant sensor arrangement 60 of a vehicle system comprises two controllers and multiple sensors 1. The individual sensors 1, in a normal mode of the vehicle system, are each coupled to a controller embodied as a primary controller 2 and, in an emergency mode of the vehicle system, are each coupled to a controller embodied as a secondary controller 4 and are supplied with power. In this instance, the controller that is coupled to the sensors 1 receives and evaluates signals from the individual sensors 1. As can furthermore be seen from FIGS. 1 and 2, the redundant sensor arrangement 60 in the depicted exemplary embodiment comprises four sensors 1, embodied as speed sensors DF1, DF2, DF3, DF4, that each have a sensor element 1.1. As can furthermore be seen from FIG. 1, the individual sensors 1 embodied as speed sensors DF1, DF2, DF3, DF4 can each be connected to evaluation electronics of the primary controller 2 via a first switching unit S1, said evaluation electronics in the depicted exemplary embodiment comprising an ASIC chip 3 and an evaluation and control unit 50 embodied as a microprocessor. Moreover, the individual sensors 1 embodied as speed sensors DF1, DF2, DF3, DF4 can each be connected to evaluation electronics of the secondary controller 4 via a second switching unit S2, said evaluation electronics in the depicted exemplary embodiment likewise comprising an ASIC chip 5 and an evaluation and control unit 51 embodied as a microprocessor. The communication between the primary controller 2 and the secondary controller 4 is effected via a data connection 30, which is embodied as a data bus in the depicted exemplary embodiment.

In the depicted exemplary embodiment, the vehicle system corresponds to a vehicle braking system. The primary controller 2 is therefore associated with a hydraulic unit, not depicted, for example an ESP hydraulic unit. The ESP hydraulic unit comprises an option for generating pressure on wheel brake cylinders of a vehicle, for example by means of a hydraulic pump or a plunger. The secondary controller 4 is associated with a controllable braking force booster, for example, not depicted. The controllable braking force booster can be understood to mean an electromechanical, electrohydraulic or else electrically controllable vacuum braking force booster. Conversely, the secondary controller 4 can also be associated with the hydraulic unit and the primary controller 2 can be associated with the braking force booster.

Both the controllable braking force booster and the hydraulic unit are capable of hydraulically causing a buildup of pressure on wheel brake cylinders, not shown, of a motor vehicle. The buildup of pressure can take place on a driver-dependent or else driver-independent basis. A driver-dependent buildup of pressure follows a driver stipulation, for example by means of a brake pedal or a brake lever. A driver-independent buildup of pressure is understood to mean an autonomous buildup of pressure attributable to control signals that are sent to the braking force booster and/or hydraulic unit in the course of emergency braking, or ACC (automated cruise control) control, for example. A driver-independent buildup of pressure may also be necessary in the sphere of highly and/or partially automated driving. The buildup of pressure by the braking force booster and the hydraulic unit can take place on the same wheel brake cylinders, in particular. As such, both the braking force booster and the hydraulic unit can build up braking pressure on a wheel brake cylinder. In particular, the braking force booster may be hydraulically connected to a main brake cylinder upstream of the hydraulic unit in series. This allows a buildup of braking pressure to be redundantly accepted from two different actuators (braking force booster and hydraulic unit).

The braking system further has, on each wheel, at least one sensor 1, for example in the form of a speed sensor DF1, DF2, DF3, DF4, that is capable of detecting the rotation velocity of the wheel. Different measurement principles can be applied in this case, for example sensors based on GMR, TMR, AMR technology, or else sensors based on the Hall effect.

As can furthermore be seen from FIG. 2, the individual sensors 1, which are embodied in exemplary fashion as speed sensors DF1, DF2, DF3, DF4, each have a sensor element 1.1 and two connections 1*a* and 1*b* for signal lines, wherein a first connection 1*a* is connected to a first node 10 and a second connection 1*b* is connected to a second node 11. The nodes 10, 11 are each connected to an input 2*a*, 2*b* of the primary controller 2 and to an input 4*a*, 4*b* of the secondary controller 4. In this instance, the first connection 1*a* of the sensor 1 is connected to a first input 2*a* of the primary controller 2 and to a first input 4*a* of the secondary controller 4 via the first node 10. The second connection 1*b* of the sensor 1 is connected to a second input 2*b* of the primary controller 2 and to a second input 4*b* of the secondary controller 4 via the second node 11.

In the depicted exemplary embodiment of the redundant sensor arrangement 60, the first switching units S1 are arranged in the primary controller 2 and the second switching units S2 are arranged in the secondary controller 4. Alternatively, the first switching units S1 and the second switching units S2 can be arranged, in an exemplary embodiment that is not depicted, only within one controller, i.e. either within the primary controller 2 or within the secondary controller 4. In a further exemplary embodiment, not depicted, the first switching units S1 and the second switching units S2 can be relocated from the controllers to an additional changeover assembly. Moreover, the nodes 10, 11, which are arranged within the sensors 1 in the depicted exemplary embodiment, can also be arranged either in the primary controller 2 or in the secondary controller 4 or in the additional changeover assembly. Additionally, the nodes 10, 11 can also be inserted directly into the applicable lines as star points or branch points. In the alternative exemplary embodiments, not depicted, the controllers are connected to one another and to the additional changeover assembly via additional direct connecting lines so that the sensor signals of the switchable sensors 1 can be transmitted to both controllers for evaluation.

The signal characteristic within the primary controller 2 and the secondary controller 4 is described below with the inclusion of the sensor 1.

As can furthermore be seen from FIG. 2, the primary controller 2 has a ground connection 18, which can also be understood to mean a ground path or sensor signal path. From there, an electrical connection is routed to a first transistor 13, which is embodied as a MOSFET, for example. The first transistor 13 can also be understood to mean a switch. The first transistor 13 is connected to a measuring element 16, which may be embodied as a nonreactive resistor or current mirror. The first transistor 13 and the measuring element 16 are part of the ASIC chip 3 within the primary controller 2 in the depicted exemplary embodiment. From the measuring element 16, the connection is then routed to a switch 7 of the first switching unit S1. The switch 7 can break the connection from the measuring element 16 to the second input 2*b* of the primary controller 2, the second sensor connection 1*b* being connected to the second input 2*b* of the primary controller 2. The switch 7 can therefore be used to make or break the connection between the sensor 1 and the ground connection 18 of the primary controller 2. The electrical connection extends from the second input 2b of the primary controller 2 to the second sensor connection 1b via the second node 11. The sensor 1 then routes the electrical connection from the first sensor connection 1a to the first input 2a of the primary controller 2 via the first node 10. The second input 2a of the primary controller 2 is connected to a further switch 6 of the first switching unit S1. The switch 6 connects the first input 2a to a second transistor 12, which is in turn connected via a supply connection 19 to a current and/or voltage source, for example to a vehicle electrical system or a vehicle battery. The switch 6 can also be used to make and/or break the electrical connection between the first sensor connection 1a and the supply connection 19 to the voltage and/or current source. The second transistor 12 is likewise part of the ASIC chip 3 in the depicted exemplary embodiment.

As can furthermore be seen from FIG. 2, the secondary controller 4 likewise has a ground connection 20, which can also be understood to mean a ground path or sensor signal path. From there, an electrical connection is routed to a first transistor 14, which is embodied as a MOSFET, for example. The first transistor 14 is connected to a measuring element 17, which is embodied as a nonreactive resistor or current mirror, for example. The first transistor 14 and the measuring element 17 are part of the ASIC chip 5 within the secondary controller 4 in the depicted exemplary embodiment. From the measuring element 17, the connection is then routed to a first switch 9 of the second switching unit S2. The first switch 9 can break the connection between the measuring element 17 and the second input 4b of the secondary controller 4, the second sensor connection 1b being connected to the second input 4b of the secondary controller 4. The first switch 9 can therefore be used to make or break the connection between the sensor 1 and the ground connection 20 of the secondary controller 4.

The electrical connection extends from the second input 4b of the secondary controller 4 to the second sensor connection 1b via the second node 11. The sensor 1 then routes the electrical connection from the first sensor connection 1a to the first input 4a of the secondary controller 4 via the first node 10. The first input 4a of the secondary controller 4 is connected to a second switch 8 of the second switching unit S2. The second switch 8 connects the first input 4a to a second transistor 15, which is connected via a supply connection 21 to a current and/or voltage source, for example to a vehicle electrical system or a vehicle battery. The second switch 8 can also be used to make and/or break the electrical connection between the first sensor connection 1a and the supply connection 21 to the voltage and/or current source. The second transistor 15 is likewise part of the ASIC chip 5 in the depicted exemplary embodiment.

The primary controller 2 and the secondary controller 4 may be of symmetrical design with reference to the switching units S1, S2. Appropriate switching of the switches 6, 7 of the first switching unit S1 in the primary controller 2 and of the switches 8, 9 of the second switching unit S2 in the secondary controller 4 allows the sensor 1 connected to the primary controller 2 and the secondary controller 4 via the nodes 10, 11 to be coupled either to the primary controller 2 or to the secondary controller 4. If the switches 6, 7 of the first switching unit S1 in the primary controller 2 are closed and the switches 8, 9 of the second switching unit S2 in the secondary controller 4 are open, then the sensor 1 is electrically connected to the ASIC chip 3 in the primary controller 2 and decoupled from the secondary controller 4. If additionally the first transistor 13 and the second transistor 12 in the ASIC chip 3 of the primary controller 2 are on, then the sensor 1 is electrically connected to the supply path and the ground path of the primary controller 2 and coupled to the primary controller 2. In the coupled state, the sensor signal received by the measuring element 16 is conditioned by an associated logic circuit 40 and output to the evaluation and control unit 50 of the primary controller 2. In the exemplary embodiment depicted, the logic circuit 40 is likewise part of the ASIC chip 3 within the primary controller 2. Moreover, the ASIC chip 3 in the exemplary embodiment depicted has a monitoring circuit 42 that can be used in the primary controller 2 to ascertain the power supply of the associated sensor 1. In the depicted exemplary embodiment, the monitoring circuit 42 detects the voltage applied to the sensor 1 when the switches 6, 7 of the first switching unit S1 are closed.

If, by contrast, the switches 6, 7 of the first switching unit S1 in the primary controller 2 are open, and the switches 8, 9 of the second switching unit S2 in the secondary controller 4 are closed, then the sensor 1 is electrically connected to the ASIC chip 5 in the secondary controller 4 and decoupled from the primary controller 2. If, additionally, the first transistor 14 and the second transistor 15 in the ASIC chip 5 of the secondary controller 4 are on, then the sensor 1 is electrically connected to the supply path and the ground path of the secondary controller 4 and coupled to the secondary controller 4. In the coupled state, the sensor signal received by the measuring element 17 is conditioned by an associated logic circuit 41 and output to the evaluation and control unit 51 of the secondary controller 4. In the depicted exemplary embodiment, the logic circuit 41 is likewise part of the ASIC chip 5 within the secondary controller 4. Moreover, the ASIC chip 5 in the depicted exemplary embodiment has a monitoring circuit 43 that can be used in the secondary controller 4 to ascertain the power supply of the associated sensor 1. In the depicted exemplary embodiment, the monitoring circuit 43 detects the voltage applied to the sensor 1 when the switches 8, 9 of the second switching unit S2 are closed. Moreover, the monitoring circuit 43 can be used to check the internal voltage supply or the supply paths of the secondary controller 2 when the switches 8, 9 in the second switching units S2 are open and the corresponding second transistors 15 in the ASIC chip 5 of the secondary controller 4 are on. In this switching state, the individual monitoring circuits 43 can measure and evaluate the voltage levels at the outputs of the second transistors 15.

As can furthermore be seen from FIGS. 1 and 2, the secondary controller 4 in the depicted exemplary embodiment has two test circuits 52, 53 that can be used to check at least one internal signal path in the secondary controller 4. As can furthermore be seen from FIG. 2, a first test circuit 52 in the secondary controller 4 can be used to impress a test signal that can be received by the measuring element 17 in the ground path of the secondary controller 4 and conditioned by the associated logic circuit 41 and output to the evaluation and control unit 51 of the secondary controller 4. If the secondary controller 4 has a further measuring element, not depicted, in the supply path, which further measuring element is looped in between the second transistor 15 and the supply connection, then an optional second test circuit 53 can be used to check this measuring element. For the check on the at least one internal signal path in the secondary controller 4, the secondary controller 4 is decoupled from the individual sensors 1 or from the speed sensors DF1, DF2, DF3, DF4. This means that the switches 8, 9 of the second switching units S2 of the secondary controller 4 are open. In an alternative exemplary embodiment, not depicted, the primary controller 2 also has at least one such test circuit 52, 53 that generates test signals for checking at least one internal signal path.

In exemplary embodiments of the operating method 100, 200, 300, 400 according to the disclosure for a redundant sensor arrangement 60 of a vehicle system, the initialization of the sensor arrangement 1 involves an operating voltage being applied to both controllers and a check on the sensor arrangement 60 being performed. In this instance, the sensors 1, in a first checking step, are coupled to the primary controller 2 and checked by the latter and decoupled from the secondary controller 4. The secondary controller 4, in the decoupled state, checks its internal voltage supply and at least one internal signal path. In a second checking step, the secondary controller 4 is connected to the sensors 1 and checks a power supply of the individual sensors 1. In addition, the initialization of the sensor arrangement 60 is concluded if no errors have occurred during the check on the sensor arrangement 60.

Figure 3:
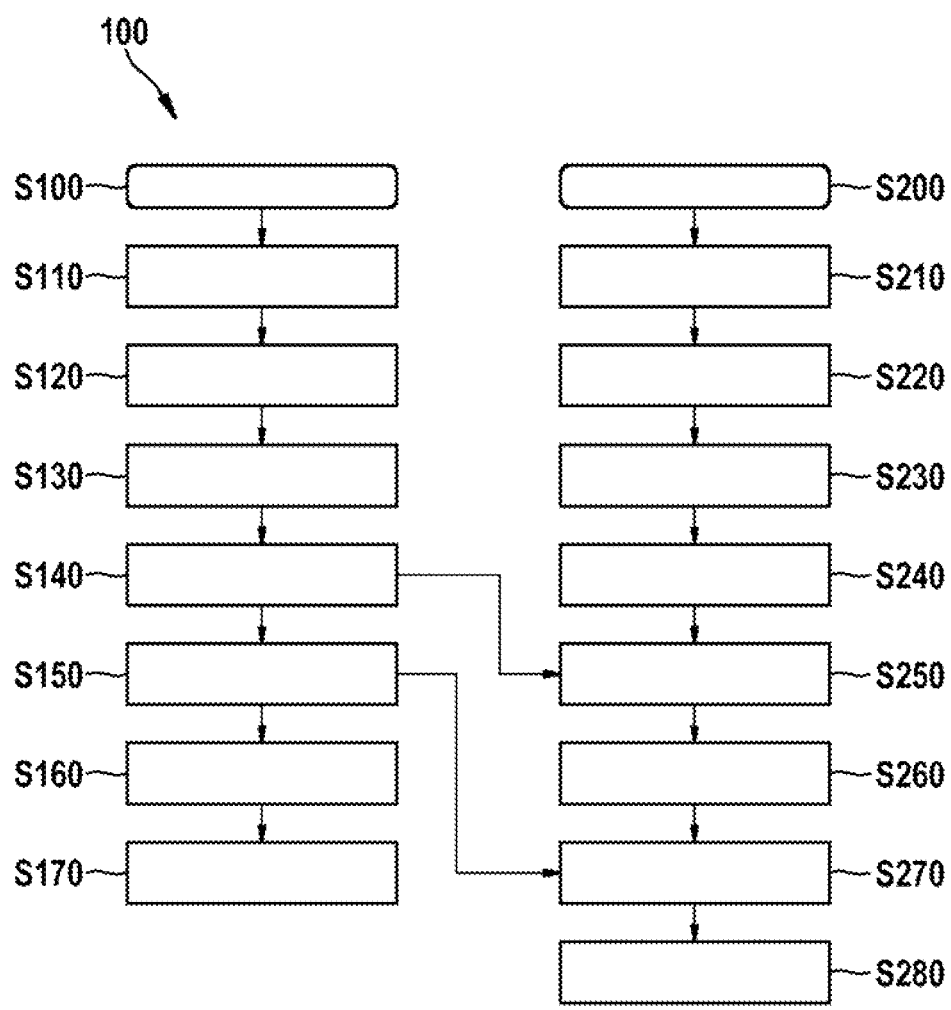
FIG. 3 shows a schematic flowchart for a first exemplary embodiment of an operating method according to the disclosure for a redundant sensor arrangement of a vehicle system from FIGS. 1 and 2.

As can be seen from FIG. 3, in the depicted first exemplary embodiment of the operating method 100 according to the disclosure for a redundant sensor arrangement 60 of a vehicle system, a step S100 involves the primary controller 2, and a parallel or simultaneous step S200 involves the secondary controller 4, being switched on or applied to the operating voltage. In step S110, it is established that the primary controller 2 is ready, which means that the internal circuits, such as the first switching units S1, the ASIC chip 3 and the evaluation and control unit 50, of the primary controller 2 have started up and can perform and undertake their intended functions and tasks. In the parallel or simultaneous step S210, it is established that the secondary controller 4 is ready, which means that the internal circuits, such as the second switching units S2, the ASIC chip 5, the test circuits 52, 53 and the evaluation and control unit 51, of the secondary controller 4 have started up and can perform and undertake their intended functions and tasks.

Thus, in the depicted first exemplary embodiment, all the sensors 1 are coupled to the primary controller 2 in step S120. This means that the switches 6, 7 of the first switching units S1 are closed and the individual sensors 1 connected to the inputs 2A, 2B of the primary controller 2 are connected to the ASIC chip 3. Within the ASIC chip 3, the transistors 12, 13 are turned on in order to connect each of the individual sensors 1 to the supply connection 19 via the supply path and to the ground connection 18 via the ground path. After the sensors 1 are coupled to the primary controller 2, standard tests are performed for the coupled sensors 1 in step S130. The standard tests can involve the signals from the coupled sensors 1 being received on the measuring elements 16, for example, and evaluated by the logic circuit 40 and the evaluation and control unit 50.

In parallel or simultaneously, all the sensors 1 are decoupled from the secondary controller 4 in step S220. This means that the switches 8, 9 of the second switching units S2 are opened and the individual sensors 1 connected to the inputs 4A, 4B of the secondary controller 4 are isolated from the ASIC chip 5, so that all the sensors 1 are decoupled from the secondary controller 4 in step S220. Next, the internal voltage supply in the secondary controller 4 is checked in step S230. This check is performed, as already indicated above, using the monitoring circuits 43 when the second transistors 15 are on. In step S240, the internal signal paths in the secondary controller 4 are checked. This check is performed, as already indicated above, using the test circuits 52, 53.

If all coupled sensors 1 pass the standard tests in the primary controller 2, then an appropriate status report is transmitted to the primary controller via the data connection 30 in step S140. The secondary controller 4 receives this status report in step S250 and evaluates it. In step S260, the secondary controller 4 checks the voltage supply of the individual sensors 1 if the check on the internal voltage supply and the at least one internal signal path was concluded successfully. During the check on the voltage supply of the individual sensors 1, the individual sensors 1 continue to be coupled to the primary controller 2 and are additionally electrically connected, by closing the switches 8, 9 in the second switching units S2, to the monitoring circuits 43 of the secondary controller 4, which are able to measure the voltages applied to the individual sensors 1. Following the check on the voltage supply of the individual sensors 1, the secondary controller 4 transmits an appropriate status report to the primary controller 2 in step S270. The primary controller 2 receives this status report in step S150 and evaluates it. If no errors have occurred during the check on the voltage supply of the individual sensors 1, then the secondary controller 4 changes to its monitoring mode, in which the secondary controller 4 continually monitors the data bus, the voltage supply of the individual sensors S1 and the primary controller 2, in step S280. If no errors have occurred during the initialization of the sensor arrangement 60, then the system initialization is concluded in step S160, or corresponding error handling is performed if errors have occurred. In step S170, the primary controller 2 changes to the normal mode and the depicted braking system is ready.

Figure 4:
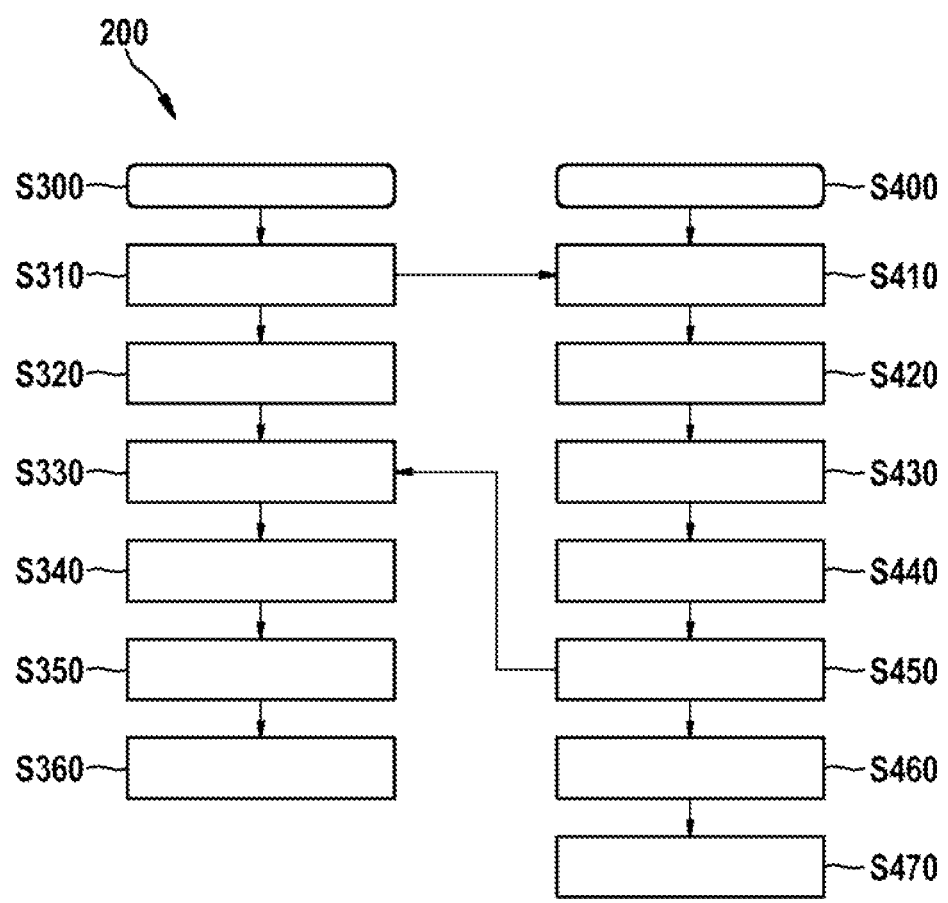
FIG. 4 shows a schematic flowchart for a second exemplary embodiment of an operating method according to the disclosure for a redundant sensor arrangement of a vehicle system from FIGS. 1 and 2.
Figure 5:
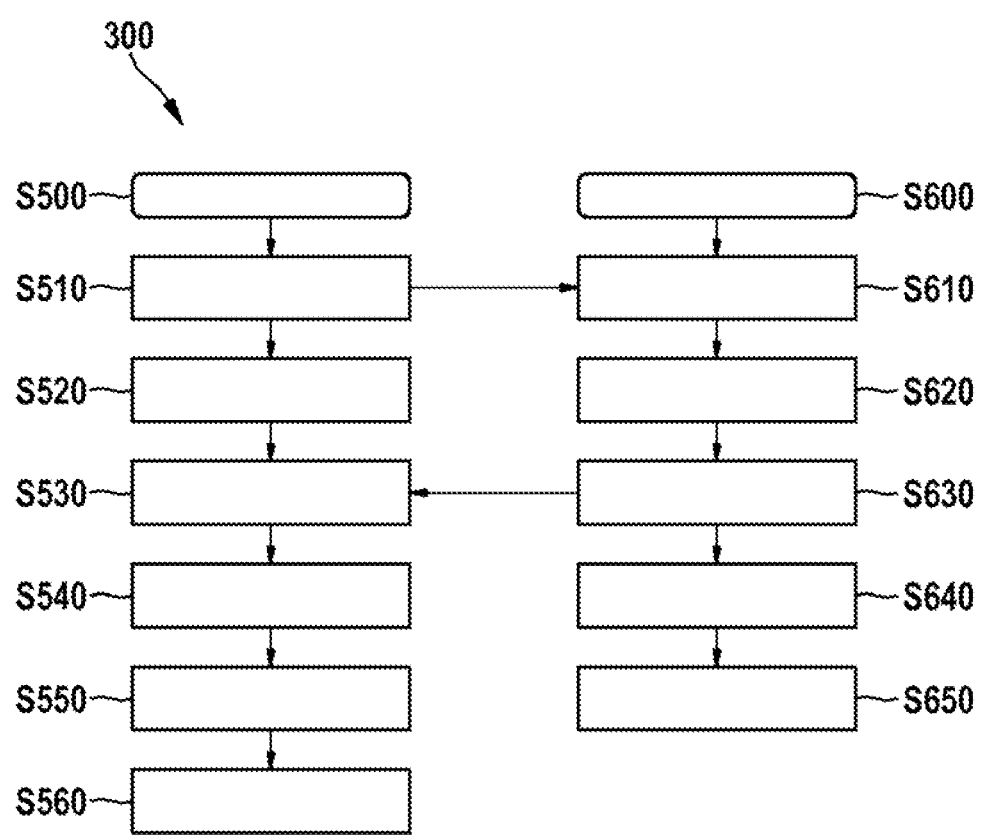
FIG. 5 shows a schematic flowchart for a third exemplary embodiment of an operating method according to the disclosure for a redundant sensor arrangement of a vehicle system from FIGS. 1 and 2.
Figure 6:
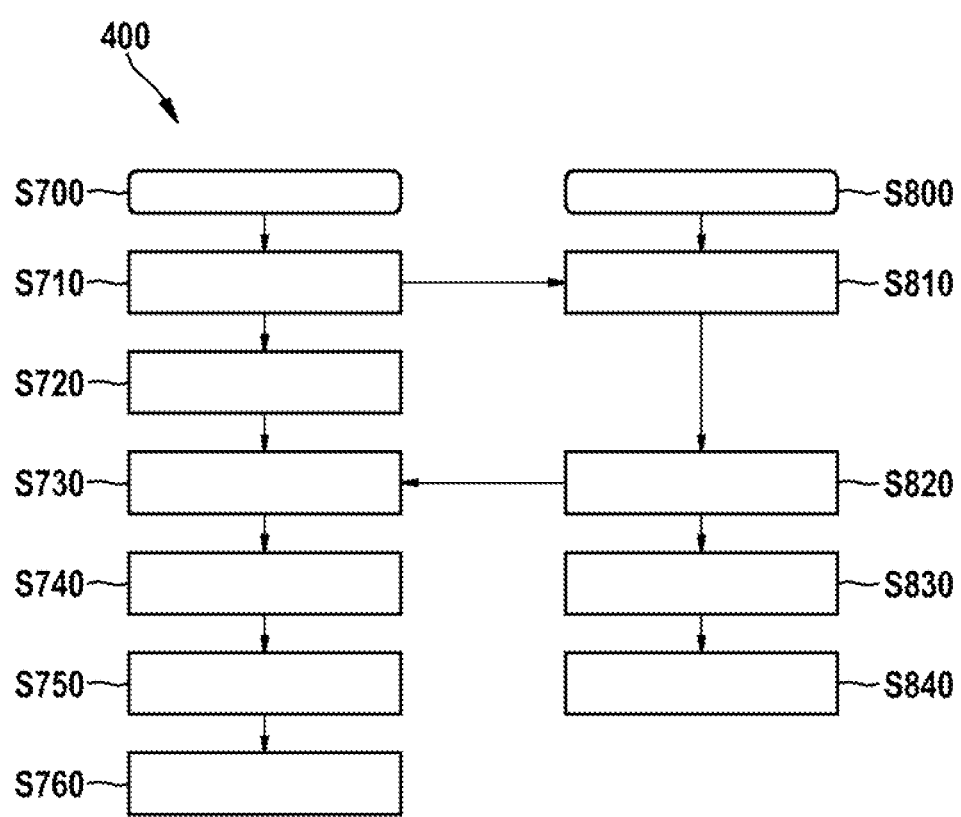
FIG. 6 shows a schematic flowchart for a third exemplary embodiment of an operating method according to the disclosure for a redundant sensor arrangement of a vehicle system from FIGS. 1 and 2.

As can furthermore be seen from FIGS. 4 to 6, the operating method 100 depicted in FIG. 3 is complemented by an installation inspection of the individual sensors 1 after initialization of the sensor arrangement 60 has concluded. In the depicted exemplary embodiments of the operating method 200, 300, 400 according to the disclosure, in each case at least one piece of installation information about the individual sensors 1 is ascertained in the primary controller 2 and in the secondary controller 4 and said pieces of installation information are compared with one another. In this instance, the check is recognized as successful if, for the sensor 1 that is to be checked, the at least one piece of installation information ascertained in the primary controller 2 is concordant with the at least one piece of installation information ascertained in the secondary controller 4. In the depicted exemplary embodiments, the at least one piece of installation information of the individual sensors 1 comprises information about installation position and/or contact-connection of the corresponding sensor 1. It is naturally also possible for alternative or additional installation information, such as for example type, design, etc., of the individual sensors 1 to be used for the installation inspection. For the installation inspection, the installation information of the individual sensors 1 can be transferred from the non-checking controller 2, 4 to the checking controller 2, 4 prior to the check, wherein the checking controller 2, 4 ascertains the installation information of the individual sensors 1 to be checked and compares it with the installation information received from the non-checking controller 2, 4. The checking controller 2, 4 then transfers the check result to the non-checking controller 2, 4. Alternatively, the individual sensors 1 can be checked in a predefined order or according to a predefined pattern regarding their installation position and/or their contact-connection. In this embodiment, the predefined order or the predefined pattern for the check is stored in the primary controller 2 and in the secondary controller 4. In this instance, the check is recognized as successful if the order of the sensors 1 checked by the primary controller 2 is concordant with the order of the sensors 1 checked by the secondary controller 4.

As can furthermore be seen from FIG. 4, in the depicted second exemplary embodiment of the operating method 200, the concluded system initialization is detected in the primary controller 2 in step S300 and the installation inspection of the individual sensors 1 is started. In parallel, the concluded system initialization is detected in the secondary controller 4 in step S400 and the installation inspection of the individual sensors 1 is started. In the depicted second exemplary embodiment of the operating method 200 according to the disclosure, the primary controller 2 hands over the individual sensors 1 sequentially to the secondary controller 4, wherein the individual sensors 1 to be checked are each decoupled from the primary controller 2 and coupled to the secondary controller 4 and checked by the latter. The primary controller 2 transmits at least one piece of installation information of the corresponding sensor 1 to the secondary controller 4 prior to the decoupling. The secondary controller 4 compares its ascertained at least one piece of installation information for the corresponding sensor 1 with the transmitted at least one piece of installation information, wherein the secondary controller 4 returns the respective checked sensor 1 and the corresponding check result to the primary controller 2, as a result of which the checked sensor 1 is once again coupled to the primary controller 2 and decoupled from the secondary controller 4. Alternatively, the primary controller 2 can transfer the installation information from all sensors 1 that are to be checked to the secondary controller 4 beforehand. Moreover, the secondary controller 4 can transfer the check result for all checked sensors to the primary controller 2 individually or jointly.

In the depicted exemplary embodiment, the primary controller 2 transmits the installation information of a sensor 1, for example a first speed sensor DF1, to the secondary controller 4 in step S310 and decouples the sensor 1 from the primary controller. This means that the switches 6, 7 of the corresponding first switching unit S1 are opened and the sensor 1 is isolated from the ASIC chip 3 and thus decoupled from the primary controller 2. Additionally, the transistors 12, 13 in the ASIC chip 3 are switched off. Optionally, the sensor 1 can also be decoupled from the primary controller 2 by only either the switches 6, 7 or the transistors 12, 13. Therefore, in step S320, the sensor 1, here the first speed sensor DF1, is decoupled from the primary controller 2 and the other sensors 1, here the speed sensors DF2, DF3, DF4, continue to be coupled to the primary controller 2. The secondary controller 4 receives the installation information of the sensor 1 in step S410 and accepts the sensor 1, here the first speed sensor DF1. Acceptance of the sensor 1 from the primary controller 2 involves the sensor 1 being coupled to the secondary controller 4. This means that the switches 8, 9 of the corresponding second switching unit S2 are closed and the sensor 1 that is connected to the corresponding inputs 4A, 4B of the secondary controller 4 is connected to the ASIC chip 5. Inside the ASIC chip 5, the corresponding transistors 14, 15 are switched on in order to connect the sensor 1 in each case to the supply connection 21 via the supply path and to the ground connection 20 via the ground path. Following acceptance of the sensor 1, here the first speed sensor DF1, the first speed sensor DF1 is coupled to the secondary controller 4 and the other sensors 1, here the speed sensors DF2, DF3, DF4, continue to be decoupled from the secondary controller 4 in step 420. Therefore, the secondary controller 4 performs a standard test for the coupled sensor 1 in step S430 and ascertains the installation information of said sensor. In step S440, the secondary controller 4 checks whether the ascertained installation information of the sensor 1 is concordant with the installation information received from the primary controller 2. In step S450, the secondary controller 4 transfers the check result to the primary controller 2 and returns the checked sensor 1, here the first speed sensor DF1, to the primary controller 2. Handover of the sensor 1 to the primary controller 2 involves the sensor 1 being decoupled from the secondary controller 4. This means that the switches 8, 9 of the associated second switching unit S2 are opened and the sensor 1 is isolated from the ASIC chip 5 and thus decoupled from the secondary controller 4. Additionally, the corresponding transistors 14, 15 in the ASIC chip 5 are switched off. Optionally, the sensor 1 can also be decoupled from the secondary controller 4 either by the switches 8, 6 or the transistors 14, 15. The primary controller 2 receives the check result from the secondary controller 4 in step S330 and accepts the sensor 1. Acceptance of the sensor 1 from the secondary controller 4 involves the sensor 1 being coupled to the primary controller 2. This means that the switches 6, 7 of the corresponding first switching unit S1 are closed and the sensor 1 that is connected to the corresponding inputs 2A, 2B of the primary controller 2 is connected to the ASIC chip 3. Inside the ASIC chip 3, the corresponding transistors 12, 13 are switched on in order to connect the sensor 1 to the supply connection 19 via the supply path and to the ground connection 18 via the ground path. Following acceptance of the sensor 1, here the first speed sensor DF1, the process is repeated in step S340 or in step S460 for the other sensors 1, here for the speed sensors DF2, DF3, DF4, until the installation inspection has concluded for all sensors 1. This means that steps S310 to S330 and S410 to S450 are repeated for each individual instance of the other sensors 1. If it is established in step S340 or S460 that all sensors 1 have also been checked by the secondary controller 4, then the installation inspection is concluded in step S350 and the primary controller 2 undertakes its tasks in the normal mode in step S360, and the braking system has its full functionality to perform the full extent of its intended braking functions. Following handover of the last sensor 1 to be checked, the secondary controller 4 in the depicted first exemplary embodiment changes to its intended monitoring mode, in which the secondary controller 4 monitors the data bus, the sensor supply and the function of the primary controller 2, in step S470. As a result, the secondary controller 4 is able to undertake at least part of the function of the primary controller 2 and to carry out the emergency mode if the primary controller 2 fails. The initialization and installation inspection of the sensor arrangement 60 is thus concluded and normal operation of the vehicle system is possible.

Alternatively, the individual sensors 1 can be decoupled from the primary controller 2 and coupled to the secondary controller 4 in a predefined order or according to a predefined pattern regarding their installation position and/or their contact-connection. In this embodiment, the secondary controller 4 checks whether the order or the pattern of the handed-over sensors 1 is concordant with the order stored in the secondary controller 4 or with the pattern stored in the secondary controller 4. If for example an ascending order of the sensors 1, embodied as speed sensors DF1, DF2, DF3, DF4, that are to be checked is predefined and a contact-connection of two sensors 1, for example the first speed sensor DF1 and the second speed sensor DF1, DF2, is switched, then the primary controller 2 first hands over the first speed sensor DF1 to the secondary controller 4 according to the predefined order. As a result of the contact-connection having been switched, however, the secondary controller 4 recognizes the second speed sensor DF2 as the sensor 1 that has been handed over. The secondary controller 4 thus ascertains the first position in the real checking order instead of the second position in the predefined checking order for the second speed sensor DF2. Therefore, the secondary controller 4 detects an installation error for the sensors 1. If the contact-connection of the sensors 1 has not been switched, then the secondary controller 4 detects the first speed sensor DF1 at the first position in the real checking order, which is concordant with the predefined position in the predefined checking order. Therefore, the secondary controller 4 does not detect an installation error for the sensors 1 in this case.

As can furthermore be seen from FIG. 5, in the depicted third exemplary embodiment of the operating method 300, the concluded system initialization is detected in the primary controller 2 in step S500 and the installation inspection of the individual sensors 1 is started. In parallel, the concluded system initialization is detected in the secondary controller 4 in step S600 and the installation inspection of the individual sensors 1 is started. In the depicted third exemplary embodiment of the operating method 300 according to the disclosure, the individual sensors 1 are decoupled from the primary controller 2 sequentially and the power supply of the connected sensors 1 is checked by the secondary controller 4 continually. Moreover, the primary controller 4 transmits at least one piece of installation information of the corresponding sensor 1 to the secondary controller 4 prior to the decoupling, wherein the secondary controller 4 detects the sensor 1 that is not supplied with power by the primary controller 2 and ascertains the at least one piece of installation information of said sensor and compares it with the transmitted at least one piece of installation information. The secondary controller 4 transmits the corresponding check result to the primary controller 2, and the checked sensor 1 is once again coupled to the primary controller 2. Alternatively, the primary controller 2 can transfer the installation information from all sensors 1 that are to be checked to the secondary controller 4 beforehand. Moreover, the secondary controller 4 can transfer the check result for all checked sensors to the primary controller 2 individually or jointly.

In the depicted exemplary embodiment, the primary controller 2 transmits the installation information of a sensor 1, for example a first speed sensor DF1, to the secondary controller 4 in step S510 and decouples the sensor 1 from the primary controller. This means that the switches 6, 7 of the corresponding first switching unit S1 are opened and the sensor 1 is isolated from the ASIC chip 3 and thus decoupled from the primary controller 2. Additionally, the transistors 12, 13 in the ASIC chip 3 are switched off. Optionally, the sensor 1 can also be decoupled from the primary controller 2 by only either the switches 6, 7 or the transistors 12, 13. Therefore, in step S520, the sensor 1, here the first speed sensor DF1, is decoupled from the primary controller 2 and the other sensors 1, here the speed sensors DF2, DF3, DF4, continue to be coupled to the primary controller 2. The secondary controller 4 receives the installation information of the sensor 1 in step S610 and checks the voltage supply of the individual sensors 1. Checking the supply to the individual sensors 1 involves the individual sensors 1 being connected to the checking circuits 43 in the ASIC chip 3 of the secondary controller 4 via the closed switches 8, 9 of the second switching units S2. Inside the ASIC chip 5, the transistors 14, 15 are off, as a result of which none of the sensors is coupled to the secondary controller 4 and supplied with power thereby. The checking circuits 43 measure the supply voltages applied to each of the individual sensors 1. During the check, the secondary controller 4 detects the sensor 1 that is not supplied with power, here the first speed sensor DF1. In step S620, the secondary controller 4 ascertains the installation information of the sensor 1 that is not supplied with power and checks whether the ascertained installation information of the sensor 1 is concordant with the installation information received from the primary controller 2. In step S630, the secondary controller 4 transfers the check result to the primary controller 2. The primary controller 2 receives the check result from the secondary controller 4 in step S530, and the checked sensor 1 is once again coupled to the primary controller 2. Coupling of the sensor 1 to the primary controller 2 involves the switches 6, 7 of the corresponding first switching unit S1 being closed and the sensor 1 that is connected to the corresponding inputs 2A, 2B of the primary controller 2 being connected to the ASIC chip 3. Inside the ASIC chip 3, the corresponding transistors 12, 13 are switched on in order to connect the sensor 1 to the supply connection 19 via the supply path and to the ground connection 18 via the ground path. Following coupling of the sensor 1, here the first speed sensor DF1, the process is repeated in step S540 or in step S640 for the other sensors 1, here for the speed sensors DF2, DF3, DF4, until the installation inspection has concluded for all sensors 1. This means that steps S510 to S530 and S610 to S630 are repeated for each individual instance of the other sensors 1. If it is established in step S540 or S640 that the installation of all sensors 1 has been checked, then the installation inspection is concluded in step S550 and the primary controller 2 undertakes its tasks in the normal mode in step S560, and the braking system has its full functionality to perform the full extent of its intended braking functions. Following transmission of the check result for the last sensor 1 to be checked, the secondary controller 4 in the depicted second exemplary embodiment changes to its intended monitoring mode, in which the secondary controller 4 monitors the data bus, the sensor supply and the function of the primary controller 2, in step S650. As a result, the secondary controller 4 is able to undertake at least part of the function of the primary controller 2 and to carry out the emergency mode if the primary controller 2 fails. The initialization and installation inspection of the sensor arrangement 60 is thus concluded and normal operation of the vehicle system is possible.

Alternatively, the individual sensors 1 can be decoupled from the primary controller 2 and connected to the secondary controller 4, for the purpose of checking the supply voltage, in a predefined order or according to a predefined pattern regarding their installation position and/or their contact-connection. In this embodiment, the secondary controller 4 checks whether the order or the pattern of the sensors 1 that are decoupled from the primary controller 2 and not supplied with power is concordant with the order stored in the secondary controller 4 or with the pattern stored in the secondary controller 4.

As can furthermore be seen from FIG. 6, in the depicted fourth exemplary embodiment of the operating method 400, the concluded system initialization is detected in the primary controller 2 in step S700 and the installation inspection of the individual sensors 1 is started. In parallel, the concluded system initialization is detected in the secondary controller 4 in step S800 and the installation inspection of the individual sensors 1 is started. In the depicted fourth exemplary embodiment of the operating method 400 according to the disclosure, the sensor signals of the individual sensors 1 are sequentially manipulated by the secondary controller 4. The primary controller 2 detects the respective manipulated sensor 1 and ascertains the at least one piece of installation information of the corresponding sensor 1. Prior to manipulating the sensor signal, the secondary controller 4 transmits at least one piece of installation information of the corresponding sensor 1 to the primary controller 2, wherein the primary controller 2 compares the ascertained at least one piece of installation information with the transmitted at least one piece of installation information of the corresponding sensor 1 and transmits the result to the secondary controller 4, which terminates the manipulation of the sensor signal of the corresponding sensor 1. Alternatively, the secondary controller 4 can transfer the installation information from all sensors 1 that are to be checked to the primary controller 2 beforehand. Moreover, the primary controller 2 can transfer the check result for all checked sensors to the secondary controller 4 individually or jointly.

In the depicted exemplary embodiment, the secondary controller 4 transmits the installation information of a sensor 1, for example a first speed sensor DF1, to the primary controller 2 in step S810 and manipulates the sensor 1. This means that the secondary controller 4 switches on the first transistor 14 in the ASIC chip 3, for example, as a result of which the sensor signal is split over the two controllers. This reduces the sensor signal of the manipulated sensor 1. The primary controller 2 receives the installation information of the manipulated sensor 1 in step S710 and checks the sensor signals of the individual sensors 1. During the check, the primary controller 2 detects the manipulated sensor signal and the associated sensor 1, here the first speed sensor DF1. In step S720, the primary controller 2 ascertains the installation information of the manipulated sensor 1 and checks whether the ascertained installation information of the sensor 1 is concordant with the installation information received from the secondary controller 4. In step S730, the primary controller 2 transfers the check result to the secondary controller 4. The secondary controller 4 receives the check result from the primary controller 2 in step S820 and terminates the manipulation of the checked sensor 1. Termination of the manipulation involves the corresponding first transistor 14 in the ASIC chip 3 being switched off again, as a result of which the sensor signal of the checked sensor 1, here the first speed sensor DF1, is no longer split and is received only by the primary controller 2. Following the check on the sensor 1, here the first speed sensor, the process is repeated in step S830 or in step S740 for the other sensors 1, here for the speed sensors DF2, DF3, DF4, until the installation inspection has concluded for all sensors 1. This means that steps S710 to S730 and S810 to S830 are repeated for each individual instance of the other sensors 1. If it is established in step S830 or S740 that the installation of all sensors 1 has been checked, then the installation inspection is concluded in step S750 and the primary controller 2 undertakes its tasks in the normal mode in step S760, and the braking system has its full functionality to perform the full extent of its intended braking functions. Following the installation inspection of the last sensor 1 to be checked, the secondary controller 4 in the depicted fourth exemplary embodiment changes to its intended monitoring mode, in which the secondary controller 4 monitors the data bus, the sensor supply and the function of the primary controller 2, in step S840. As a result, the secondary controller 4 is able to undertake at least part of the function of the primary controller 2 and to carry out the emergency mode if the primary controller 2 fails. The initialization and installation inspection of the sensor arrangement 60 is thus concluded and normal operation of the vehicle system is possible.

Alternatively, the individual sensors 1 can be manipulated by the secondary controller 4 in a predefined order or according to a predefined pattern regarding their installation position and/or their contact-connection. In this embodiment, the primary controller 2 checks whether the order or the pattern of the manipulated sensors 1 is concordant with the order stored in the primary controller 2 or with the pattern stored in the primary controller 2.

The described exemplary embodiments of the operating method 100, 200, 300, 400 can be implemented for example in software or hardware or in a hybrid form comprising software and hardware in the primary controller 2 and in the secondary controller 4.

The invention claimed is:

1. An operating method for a redundant sensor arrangement of a vehicle system, which sensor arrangement comprises a primary controller, a secondary controller and multiple sensors, wherein individual sensors of the multiple sensors, in a normal mode of the vehicle system, are each coupled to the primary controller and, in an emergency mode of the vehicle system, are each coupled to the secondary controller and are supplied with power, wherein the controller that is coupled to the individual sensors receives and evaluates signals from the individual sensors, comprising:
applying an operating voltage to both controllers;
coupling the individual sensors, while the operating voltage is applied to both controllers in a first checking step, to the primary controller, and checking the coupled individual sensors with the primary controller while the secondary controller is decoupled from the individual sensors;
checking, with the secondary controller in the decoupled state, the secondary controller internal voltage supply and at least one internal signal path of the secondary controller;
checking, in a second checking step, a power supply of the individual sensors with the secondary controller by connecting the individual sensors to the primary controller and the secondary controller, and measuring a supply voltage applied to the individual sensors from the power supply with at least one monitoring circuit of the secondary controller; and
concluding initialization of the sensor arrangement when no errors have occurred during the first checking step and the second checking step.

2. The operating method as claimed in claim 1, wherein:
the sensors, when coupled to at least one of the primary and secondary controllers, are each connected to a supply connection of the supply voltage via a supply path and to a ground connection of the associated controller via a ground path and are supplied with power; and
a measuring element configured to receive the respective sensor signal is arranged at least in the ground path.

3. The operating method as claimed in claim 1, further comprising:
monitoring the primary controller and the power supply of the individual sensors coupled to the primary controller with the secondary controller in the normal mode of the vehicle system.

4. The operating method as claimed in claim 1, wherein checking at least one internal signal path of the secondary controller comprises:
generating at least one test signal in the secondary controller.

5. The operating method as claimed in claim 1, further comprising:
performing an installation inspection of the individual sensors in a predefinable order after initialization of the sensor arrangement has concluded.

6. The operating method as claimed in claim 5, wherein performing the installation inspection comprises:
ascertaining in the primary controller and the secondary controller for each of the individual sensors a respective at least one piece of installation information about the individual sensors;
comparing said respective at least one piece of installation information with one another; and
recognizing the check as successful when, for the sensor that is to be checked, the respective at least one piece of installation information ascertained in the primary controller is concordant with the respective at least one piece of installation information ascertained in the secondary controller,
wherein the respective at least one piece of installation information of the individual sensors comprises information about at least one of installation position and contact-connection of the corresponding individual sensor.

7. The operating method as claimed in claim 6, wherein performing the installation inspection further comprises:
transferring the respective at least one piece of installation information of the individual sensors from the non-checking controller to the checking controller prior to the check;
ascertaining with the checking controller the respective at least one piece of installation information of the individual sensors that are to be checked and comparing it with the respective at least one piece of installation information received from the non-checking controller; and
transferring with the checking controller the check result to the non-checking controller.

8. The operating method as claimed in claim 5, wherein the individual sensors are checked in one of a predefined order and according to a predefined pattern regarding at least one of their installation position and contact-connection, the method further comprising:
storing the one of the predefined order and the predefined pattern of the check in the primary controller and in the secondary controller; and
recognizing the check as successful when the order of the sensors checked by the primary controller is concordant with the order of the sensors checked by the secondary controller.

9. The operating method as claimed in claim 6, wherein performing the installation inspection further comprises:
handing over with the primary controller the individual sensors sequentially to the secondary controller by decoupling the individual sensors to be checked from the primary controller;
coupling the individual sensors to be checked to the secondary controller;
checking the individual sensors to be checked with the secondary controller; and,
returning the checked individual sensors to the primary controller, as a result of which the checked sensor is once again coupled to the primary controller and decoupled from the secondary controller.

10. The operating method as claimed in claim 6, wherein performing the installation inspection further comprises:
decoupling the individual sensors from the primary controller sequentially;
checking with the secondary controller the power supplies of the connected sensors continually;
detecting with the secondary controller detects the individual sensor that is not supplied with power by the primary controller and checking the respective at least one piece of installation information of said sensor; and
coupling the checked sensor to the primary controller.

11. The operating method as claimed in claim 6, wherein performing the installation inspection further comprises:
sequentially manipulating, with the secondary controller, sensor signals of the individual sensors;
detecting with the primary controller the sequentially manipulated sensor and checking the installation information thereof; and
terminating the manipulation with the secondary controller after the check on the sequentially manipulated sensor,
wherein the manipulating the sensor signals results in a signal loss at the primary controller.

12. A redundant sensor arrangement for a vehicle system, comprising:
a primary controller;
a secondary controller; and
multiple sensors, wherein
individual sensors of the multiple sensors, in a normal mode of the vehicle system, are each coupled to the primary controller and, in an emergency mode of the vehicle system, are each coupled to the secondary controller and are supplied with power,
the controller that is coupled to the sensors receives and evaluates signals from the individual sensors, the secondary controller has at least one test circuit that generates test signals for checking at least one internal signal path, and
the redundant sensor arrangement is configured to
apply an operating voltage to both controllers,
couple the individual sensors while the operating voltage is applied to both controllers in a first checking step, to the primary controller, and check the coupled individual sensors with the primary controller while the secondary controller is decoupled from the individual sensors,
check, with the secondary controller in the decoupled state, the secondary controller internal voltage supply and the at least one internal signal path of the secondary controller,
check, in a second checking step, a power supply of the individual sensors with the secondary controller by connecting the individual sensors to the primary controller and the secondary controller, and measuring a supply voltage applied to the individual sensors from the power supply with at least one monitoring circuit of the secondary controller, and
conclude initialization of the sensor arrangement when no errors have occurred during the first checking step and the second checking step.

13. The operating method as claimed in claim 1, wherein:
connecting the individual sensors to the primary controller includes closing switches of a primary switching unit of the primary controller,
connecting the individual sensors to the secondary controller includes closing switches of a secondary switching unit of the secondary controller, and in the second checking step, the switches of the primary switching unit are closed and additionally the switches of the secondary switching unit are closed.

* * * * *